United States Patent Office 2,912,474
Patented Nov. 10, 1959

2,912,474

PREPARATION OF 1-YNE,3,5-DIENE, 4-METHYL-HEXANE

William Oroshnik, Plainfield, N.J., assignor to Ortho Pharmaceutical Corporation, a corporation of New Jersey No Drawing. Application June 19, 1956
Serial No. 592,252

1 Claim. (Cl. 260—678)

This invention relates to compositions of matter and to methods for preparing the same and particularly relates to compositions of matter which are intermediates in the preparation of vitamin A ethers and esters and to a method of preparing such intermediates.

The present application is a continuation-in-part of my application Serial No. 343,784, filed March 20, 1953, now U.S. Patent No. 2,819,316.

It is an object of this invention to prepare the compounds to be used in the preparation of vitamin A and its derivatives.

Other objects of this invention will be apparent from the description following and the appended claims.

It has now been discovered that ethers and esters of vitamin A may be prepared from a compound having the following formula:

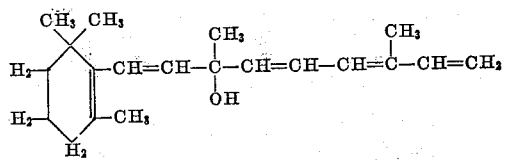

Compound II

Compound II, in the presence of acids, may undergo the allylic rearrangement-dehydration illustrated in Table I to give anhydro-vitamin A, identical in every way with that formed from vitamin A itself. Under carefully controlled conditions of acidity, it is possible to isolate the intermediate compounds III and IV shown in Table I. If the rearrangement is done in methanol, the intermediate compound may be a tertiary-methoxy compound III, and if the rearrangement is carried out in aqueous media, the rearrangement product may be a hydroxy compound IV. These rearrangement products can react in either or both of two ways: (1) Compound III can rearrange to vitamin A methyl ether in methanol, or, (2) it can lose the elements of methanol to form a 2′–3′ double bond in the ring, giving anhydro-vitamin A.

The intermediate compound IV can rearrange to vitamin A or vitamin A esters (in the presence of organic acids) by reaction (1); or compound IV can also dehydrate to anhydro-vitamin A by reaction (2). The rearrangement of compounds III and IV may be carried out to advantage under conditions where the acidity is not too strong. By the use of methanol or aqueous tertiary-butanol as a solvent and the presence of catalytic quantities of boron trifluoride, which acts as an acid in these media, one can obtain vitamin A ethers or vitamin A alcohol.

It has also been discovered that compound II may be synthesized from a compound having the formula:

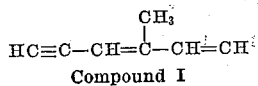

Compound I

Compound I is reacted with a Grignard reagent to replace the hydrogen on the terminal triple bonded carbon with MgX, in which X is halogen, the acetylenic Grignard is condensed with β-ionone to provide a condensation product having the formula

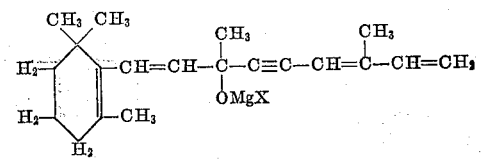

which is then hydrolyzed to replace the magnesium halide with hydrogen. The resulting compound has the formula

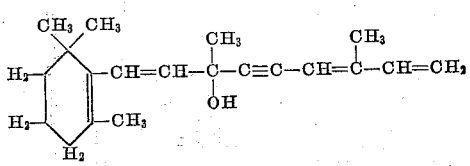

Compound V and may be reduced with lithium aluminum hydride, to give compound II having a trans configuration at the 4,5-double bonded linkage, or with hydrogen in the presence of a metallic catalyst, to give compound II having a cis configuration at the 4,5-double bonded linkage.

Compound I may be prepared by either of two processes:

(a) Propargyl methyl vinyl carbinol having the formula

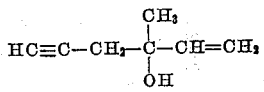

is treated with a halogenating agent such as concentrated hydrochloric acid, hydrobromic acid, thionyl chloride, phosphorus trichloride, or phosphorus oxychloride to replace the hydroxyl group with halogen. The resulting halide, having the formula

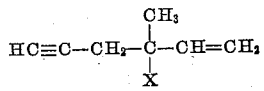

in which X is halogen, is treated with a base such as an alkali metal alcoholate or collidine to give compound I.

(b) Ethynyl tiglol having the formula

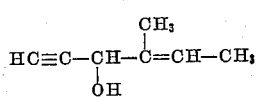

is treated with a halogenating agent such as concentrated hydrochloric acid, hydrobromic acid, thionyl chloride, phosphorus trichloride, or phosphorus oxychloride to replace the hydroxyl group with halogen and to simultaneously bring about allylic rearrangement to provide a compound having the formula

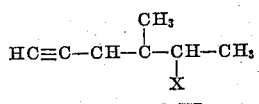

Compound VI in which X is halogen. Compound VI is converted to compound I by treatment with a base such as an alkali metal alcoholate or collidine.

TABLE I
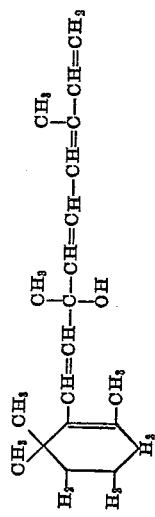
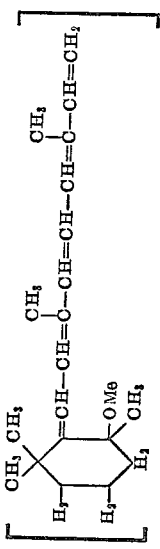
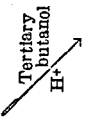
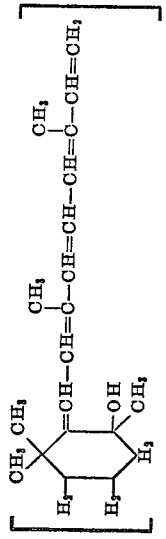
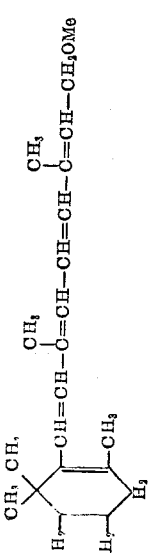
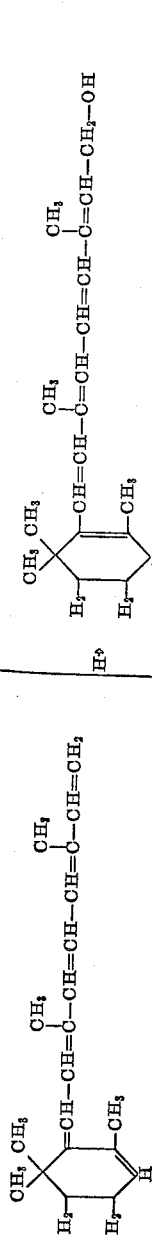

Example I.—Preparation of compound I from propargyl methyl vinyl carbinol

A mixture of 40 grams of propargyl methyl vinyl carbinol, 160 ml. of concentrated hydrochloric acid, 100 ml. of ether and 0.1 gram hydroquinone was shaken at room temperature for three and one-half hours. The mixture was diluted with water, the ether layer separated, washed with brine, and added to a solution of 12.5 grams of sodium in 120 ml. of methanol. The ether was distilled off and the mixture was then refluxed with stirring for three hours. The methanol solution was poured into a large volume of water and extracted with pentane. After drying the extract, the pentane was evaporated off and the residue was distilled at 53–54° C. at a pressure of 90 mm. Hg. The product, which weighed 17.9 grams, had a refractive index $n_D^{17}$ of 1.5158, and showed an absorption maximum in the ultraviolet at 2590 A. (molecular coefficient of extinction, 21,500). The calculated values for carbon and hydrogen are 91.24% and 8.76%, respectively. 91.29% C and 8.96% H were found on analysis.

Example II.—Preparation of compound V

A solution of 11.8 grams of compound II in 250 ml. of dry ether was treated at 10° C. with a 2 to 5% excess of ethyl magnesium bromide. Ethane was spontaneously evolved, as the solution came to room temperature. After stirring at room temperature for three hours, the solution was refluxed for an additional 15 hours, after which time gas was no longer evolved. The solution was then cooled to 10° C. and 25.7 grams of β-ionone were dropped in during ten minutes. After a two-hour period of refluxing, the mixture was again cooled and carefully hydrolyzed with ammonium acetate solution. The ether layer was removed, washed with water, dried over anhydrous potassium carbonate, and concentrated under vacuum. The residue was distilled at a pressure of 0.001 mm. Hg. The distilled material had a refractive index at 21° C. of 1.5548 and showed an absorption maximum in the ultraviolet at 2670 A. (molecular coefficient of extinction, 23,800). The calculated values for carbon and hydrogen are 84.45% and 9.92%, respectively. 84.35% C and 9.93% H were found on analysis.

Example III.—Reduction of compound V to compound II in which the 4,5-double bonded linkage has a trans configuration A solution of 29.4 grams of compound IV in 100 ml. of dry ether was added at 0° C. to 3.5 grams of commercial lithium aluminum hydride in 300 ml. of dry ether. The mixture was refluxed for three hours, after which time it was cooled and hydrolyzed with 70% methanol. The precipitated alumina was filtered off, and the ether layer separated, washed with water, dried with anhydrous potassium carbonate, and distilled at 0.001 mm. Hg pressure. The distilled product had a refractive index $n_D^{20}$ of 1.5526 and showed an absorption maximum in the ultraviolet at 2710 A. (molecular coefficient of extinction, 29,100). The calculated values for carbon and hydrogen are 83.86% and 10.56%, respectively. 83.61% C and 10.46% H were found on analysis.

Example IV.—Catalytic reduction of compound V to compound II in which the 4,5-double bonded linkage has a cis configuration To a solution of 27.0 grams of compound IV in 150 ml. of methanol was added 2.5 grams of Raney nickel, 0.5 gram of zinc acetate and 10 ml. of piperidine. The latter two components are catalyst poisons for making the hydrogenation more selective. The mixture was then shaken under hydrogen at atmospheric pressure until the theoretical amount of hydrogen was absorbed. The mixture was then filtered and worked up with water and ether. The ether was removed and the concentrated material was distilled at 0.01 mm. Hg pressure. The distilled product (20.9 grams) had a refractive index at $n_D^{16}$ of 1.5353 and showed an absorption maximum in the ultraviolet at 2720 A. (molecular coefficient of extinction, 15,600). Calculated values for carbon and hydrogen for compound II are 83.86% and 10.56% respectively. 83.87% C and 10.81% H were found on analysis.

Example V.—Conversion of compound II, in which the 4,5-double bonded linkage has a trans configuration, to vitamin A methyl ether A solution of 3.0 grams of compound II, in which the 4,5-double bonded linkage had a trans configuration, in 150 ml. of methanol was treated at 25° C. with 4 mg. of iodine dissolved in 10 ml. of methanol. Within seven minutes, spectral analysis indicated that about 90% of vitamin A methyl ether and 10% anhydro-vitamin A were present. These may be separated by chromatography on alumina.

Example VI.—Conversion of compound II, in which the 4,5-double bonded linkage has a cis configuration, to vitamin A methyl ether The amounts and conditions of this example were the same as those of Example V except that compound II, in which the 4,5-double bonded linkage had a cis-configuration, was used. Twenty-four hours after the start of the reaction, spectral analysis indicated about 90% vitamin A methyl ether and 10% anhydro-vitamin A were present in the reaction mixture. Both anhydro-vitamin A and vitamin A methyl ether were isolated by chromatography on alumina.

Example VII.—Conversion of compound II, in which the 4,5-double bonded linkage has a trans configuration, to vitamin A acetate A solution of three grams of compound II in which the 4,5-double bonded linkage had a transconfiguration was dissolved in one liter of glacial acetic acid and allowed to stand at room temperature for three days. It was then diluted in a large volume of water and extracted with petroleum ether. The petroleum ether solution, after neutralization with sodium bicarbonate solution and drying, was concentrated under vacuum to a viscous syrup. Vitamin A acetate was obtained from the syrup by chromatography on an alumina column.

Example VIII.—Preparation of compound I from ethynyl tiglol

A mixture of 40 grams of ethynyl tiglol, 200 ml. of concentrated hydrochloric acid, 100 ml. of ether, and 0.1 gram hydroquinone was shaken at room temperature for two hours. The mixture was then diluted with water, the ether layer separated and added to a solution of 12.5 grams of sodium in 250 ml. of isopropanol. The mixture was refluxed for three hours, cooled, poured into a large volume of water and extracted with pentane. The pentane solution was dried, and the pentane was removed by distillation. The residue was distilled at 53–54° C. at a pressure of 90 mm. Hg. The product, which weighed 13 grams, had a refractive index $n_D^{17}$ of 1.5158, and showed an absorption maximum in the ultra-violet at 2590 A. (molecular coefficient of extinction, 21,500). The calculated values for carbon and hydrogen were 91.24% and 8.76%, respectively. 91.29% C and 8.96% H were found.

Since certain changes in carrying out the above process and certain modifications in the compositions which embody the invention may be made without departing from its scope, it is intended that all matter contained in the description shall be interpreted as illustrative and not in a limiting sense.

What is claimed is:

The method comprising reacting a compound of the formula

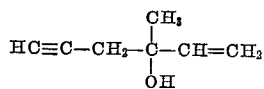

with a halogenating agent selected from the group consisting of hydrochloric acid, hydrobromic acid, thionyl chloride, phosphorus trichloride and phosphorus oxychloride to provide a compound of the formula

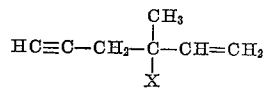

in which X is a halogen, and dehydrohologenating this compound with a base selected from the group consisting of alkali metal alcoholates and collidine to provide a compound of the formula

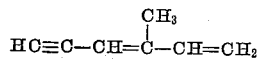

References Cited in the file of this patent

UNITED STATES PATENTS

| 1,986,876 | Baxter et al. | Jan. 8, 1935 |
| 2,369,161 | Milas | Feb. 13, 1945 |
| 2,475,139 | Isler et al. | July 5, 1949 |
| 2,542,976 | Airs et al. | Feb. 27, 1951 |
| 2,587,457 | Freed | Feb. 26, 1952 |

OTHER REFERENCES

Jones et al.: J. Chem. Soc. (London), 1943, pp. 261–4.
Nazarov et al.: Chem. Abstracts, vol. 37, 2343 (1943).
Johnson: "Acetylenic Compounds," vol. I, p. 73, Edward Arnold and Co., London, 1946.